(12) United States Patent
Li et al.

(10) Patent No.: US 8,682,646 B2
(45) Date of Patent: Mar. 25, 2014

(54) SEMANTIC RELATIONSHIP-BASED LOCATION DESCRIPTION PARSING

(75) Inventors: Jin Li, Beijing (CN); Guang Yang, Beijing (CN); Shuang Peng, Beijing (CN); Zhenyu Qian, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1209 days.

(21) Appl. No.: 12/132,623

(22) Filed: Jun. 4, 2008

(65) Prior Publication Data
US 2009/0306961 A1 Dec. 10, 2009

(51) Int. Cl.
*G06F 17/27* (2006.01)

(52) U.S. Cl.
USPC ............ 704/9; 704/4; 704/7; 704/8; 704/10

(58) Field of Classification Search
USPC ..................................... 704/4–10
See application file for complete search history.

(56) References Cited

U.S. PATENT DOCUMENTS

| | | | |
|---|---|---|---|
| 6,138,085 A | 10/2000 | Richardson et al. | |
| 2002/0138479 A1 | 9/2002 | Bates et al. | |
| 2003/0225725 A1 | 12/2003 | Miller et al. | |
| 2003/0226131 A1 | 12/2003 | Li | |
| 2004/0138817 A1 | 7/2004 | Zoken et al. | |
| 2005/0108213 A1 | 5/2005 | Riise et al. | |
| 2006/0022048 A1* | 2/2006 | Johnson | 235/462.1 |
| 2007/0011150 A1 | 1/2007 | Frank | |
| 2007/0015119 A1 | 1/2007 | Atenasio | |
| 2009/0132468 A1* | 5/2009 | Putivsky et al. | 707/2 |
| 2009/0132485 A1* | 5/2009 | Reed et al. | 707/3 |
| 2009/0132513 A1* | 5/2009 | McKee et al. | 707/5 |
| 2009/0132514 A1* | 5/2009 | Kislyuk et al. | 707/5 |
| 2009/0132646 A1* | 5/2009 | Yang et al. | 709/203 |
| 2009/0132927 A1* | 5/2009 | Reed et al. | 715/733 |
| 2009/0132953 A1* | 5/2009 | Reed et al. | 715/781 |

FOREIGN PATENT DOCUMENTS

WO 2007027608 A2 3/2007

OTHER PUBLICATIONS

"LIO Address Parser", GeoConnections, 2005. http://cms.mnr.gov.on.ca/home/LIO_Services/Address_Parse/address_webdoc.htm.
"Web Services Geocoder", 2007. http://www.isharemaps.com/support/isharemaps_on_demand/web_services_geocoder.html.
"GeoPinpoint™ Suite", www.dmtispatial.com, downloaded prior to Jun. 4, 2008.

* cited by examiner

*Primary Examiner* — Leonard Saint Cyr
(74) *Attorney, Agent, or Firm* — Aaron Chatterjee; Andrew Sanders; Micky Minhas (57) ABSTRACT

An automated arrangement for parsing location descriptions is provided in which semantic verification is integrated into a parsing process to reduce the generation of false results. The semantic verification involves checking up to three semantic relationships between keywords (i.e., syntactical components) parsed from the location description in a tokenization process to determine if a tokenization result is valid. The semantic relationships include: a) a spatial "part-of" relationship between location keywords; b) a spatial "near-by" relationship; and, c) a spatial "intersect" relationship. The semantic relationships between particular locations may be pre-calculated and stored as extended vocabulary to enable the semantic verification to occur early in the parsing process to thus increase overall parsing efficiency. The results of the parsing are sorted based on a rank score that is derived using the semantic relationships between the locations.

20 Claims, 10 Drawing Sheets

SEMANTIC RELATIONSHIP-BASED LOCATION DESCRIPTION PARSING

BACKGROUND

Location description parsing means to decompose a location description into several syntactical components and is typically performed by applying the grammatical rules by which such a description is composed. Location description parsing is often a key step for on-line services such as mapping and search tools to understand a user query and deliver relevant results for the query.

Location description parsing can often be very difficult because abbreviations for locations are commonly utilized, but there is not always a standardized way to abbreviate and not all users will use the same abbreviation. A location may also have several commonly used aliases that can be more well-known than the official name of the location. And, many different locations often have the same or similar names.

One major drawback of existing parsing systems is that they may produce too many false results for which no real-world meanings exist. Accordingly, in order to obtain a correct result, additional semantic analysis steps are typically applied after the parsing to improve accuracy and reduce the occurrence of false results. Semantic analysis attempts to figure out a sensible meaning for syntactical components through the application of various techniques. But because they represent additional steps, such analysis may often give rise to an efficiency problem and slow the responsiveness of the on-line service to the user's query. The situation is worse for Chinese and other Asian languages, since these languages do not have natural word boundaries, so there are many more possible ways for parsing systems to group a sequence of characters into a sequence of words in these languages as compared to English.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An automated arrangement for parsing location descriptions is provided in which semantic verification is integrated into a parsing process to reduce the generation of false results. The semantic verification involves checking up to three semantic relationships between keywords (i.e., syntactical components) parsed from the location description in a tokenization process to determine if a tokenization result is valid. The semantic relationships include: a) a spatial "part-of" relationship between location keywords; b) a spatial "nearby" relationship; and, c) a spatial "intersect" relationship. Thus, for example, if keywords in a location description include a street name and a city name, then the street would be expected to be "part of," the city for the location description to make reasonable sense. The semantic verification will check a semantic relationship module to determine whether the street is actually within the spatial (e.g., geographic) boundary of the city. Similarly, two streets can be checked to verify whether they intersect, and a point-of-interest can be checked to determine if it is near a landmark, for example.

The semantic relationships between particular locations (such as streets, cities, states, points-of-interest, neighborhoods, landmarks, etc.) may be pre-calculated and then added as attributes to extend the location vocabulary used by the parsing process. The pre-calculation enables the semantic verification to occur early in the parsing process to thus increase overall parsing efficiency. The results of the parsing are sorted based on a rank score that is derived using the semantic relationships between the locations. In various illustrative examples, the present semantic relationship-based location description parsing is utilized in applications respectively involving geocoding, location detection, and local search.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
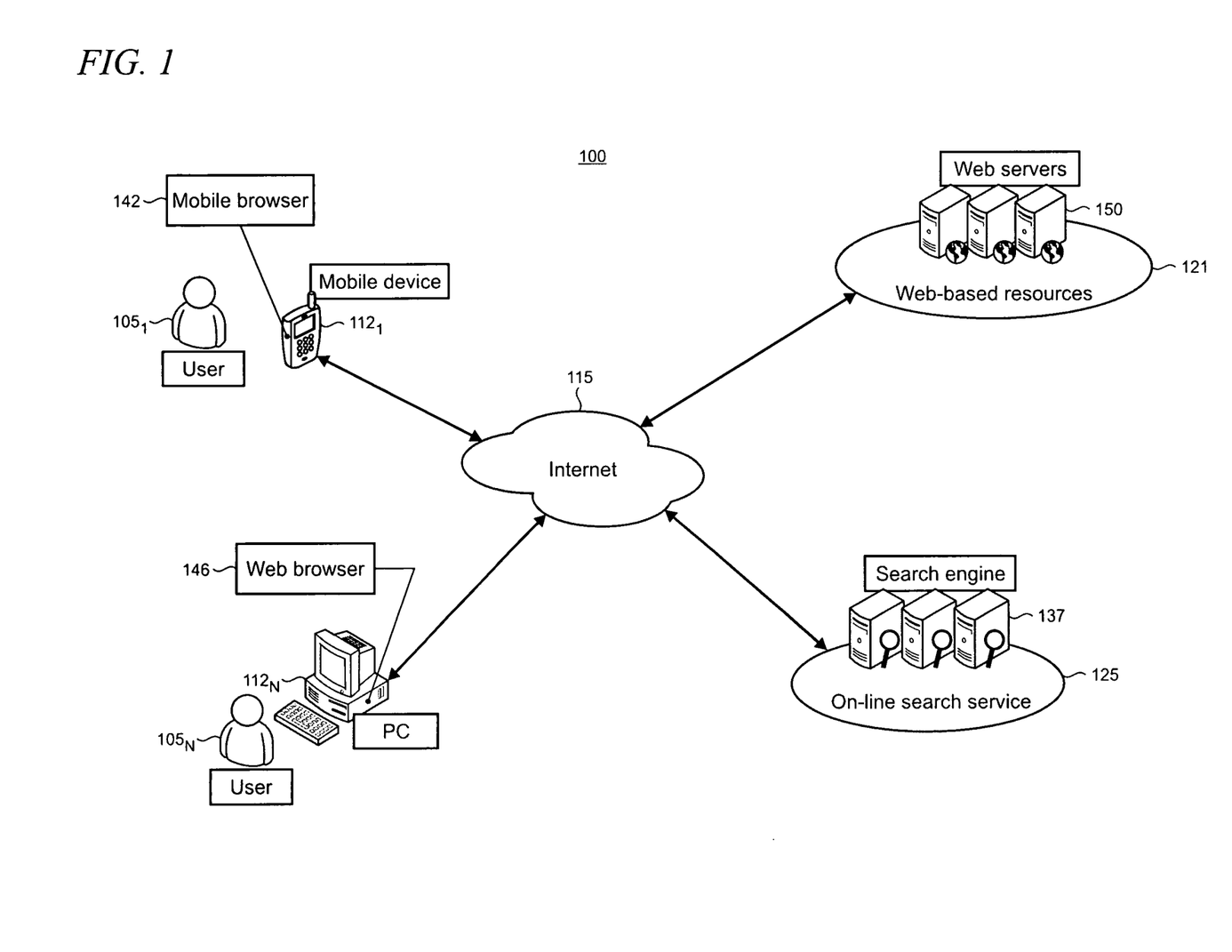
FIG. 1 shows an illustrative on-line computing environment in which the present semantic relationship-based location description parsing may be practiced.

FIG. 1 shows an illustrative on-line computing environment 100 in which the present semantic relationship-based location description parsing may be practiced. The environment 100 supports a mobile device $112_1$ and a PC $112_N$ which are intended to represent ones of various types of devices respective users $105_{1...N}$ may utilize to access various on-line resources such as web-based resources 121 and an on-line search service 125 which may support, for example, web-, local-, or map-searching over a network such as the Internet 115. Mobile device $112_1$ is representative of a variety of small and portable devices including, for example, mobile phones, smart phones, PDAs (personal digital assistant), handheld game devices, portable media players, and the like. Alternatives to PC $112_N$ include devices such as set-top boxes, media centers, game consoles, and the like.

The on-line search service 125 includes a search engine 137 with which the users 105 will typically interact using a browser functionality, for example a mobile browser 142 running on the mobile device $112_1$, or a web browser 146 running on the PC $112_N$. In alternative implementations, a user 105 may interface with the search engine 137 through, for example, a desktop search application or another application that is configured to interface with a search engine API (application programming interface).

The search engine 137 is typically configured to crawl resources located on the Web such as Web servers 150 in order to compile an ongoing index of Web addresses (i.e., URLs—Uniform Resource Locators) and analyze content contained in the pages at those addresses which it can index and store in a database. When a user 105 submits a query through a browser to the search engine 137, the search engine will typically compare it with the information in its index and report back any matches.

Figure 2:
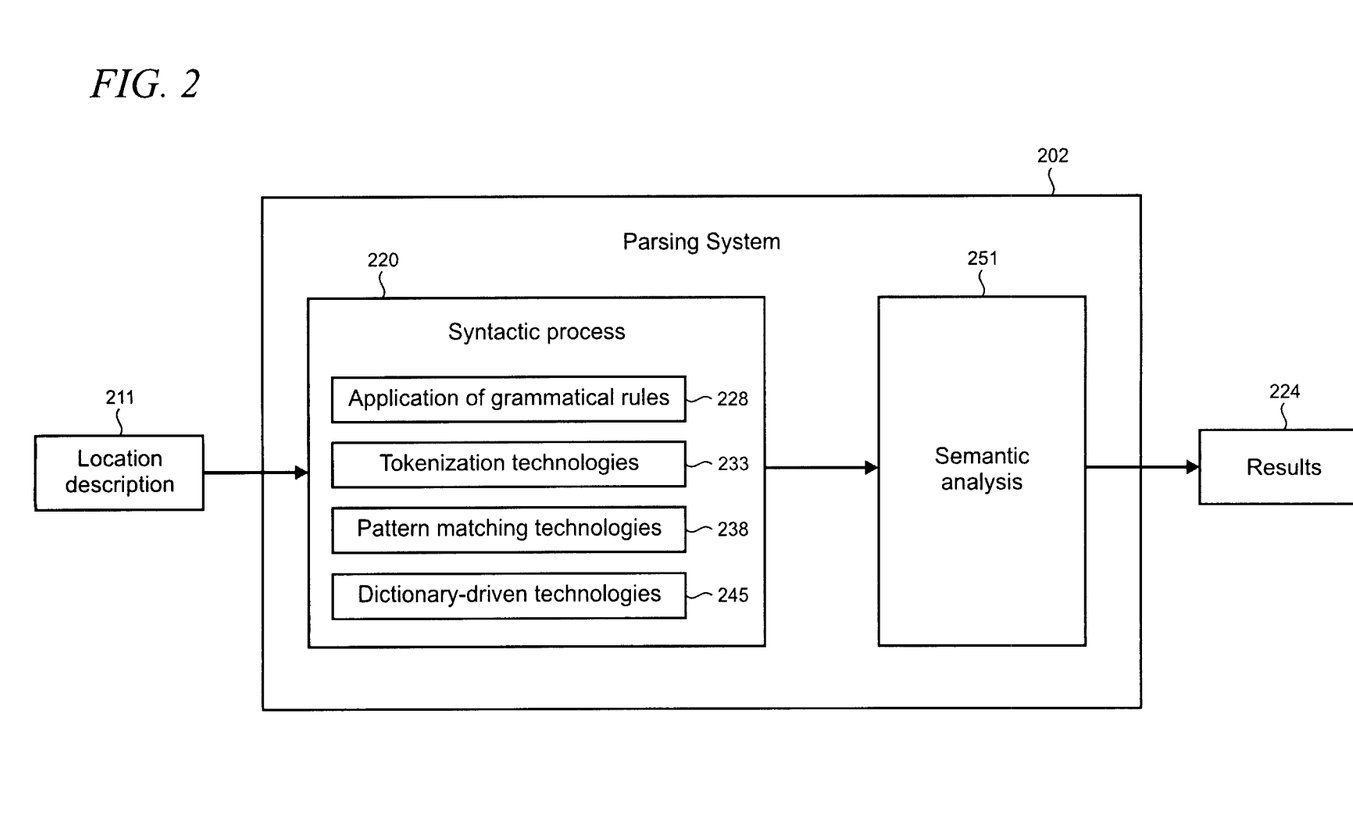
FIG. 2 shows a conventional location description parsing system that includes a syntactic process and semantic analysis.

FIG. 2 shows a conventional location description parsing system 202 that includes a syntactic process and semantic analysis. Parsing system 202 could be used, for example, by the on-line search service 125 as part of a location-based service offering such as a map search or local search. The parsing system 202 takes a location description 211 that is typically entered by a user 105 and subjects it to a syntactic process 220 to decompose the location description into syntactic components such as street number, street name, landmark or point-of-interest name, neighborhood name, city name, country name, even direction and distance description. The syntactic components (i.e., keywords) are then output as results 224.

The syntactic process 220 will typically combine several known methods shown in FIG. 2. The methods include: a) the application of grammatical rules 228 to decompose the location description into syntactic components; b) tokenization technologies 233 using "n-gram" tokenization models using the statistical properties of n-grams (an n-gram is the subsequence of n items from a given sequence. The items may be letters, words, or base pairs depending on the requirements of a particular application); c) pattern matching technologies 238 that match the local description 211 with possible patterns; and, d) dictionary-driven technologies 245 in which a dictionary comprising common or domain-specific vocabulary is utilized.

The location description 211 from a user 105 can be formed irregularly and not always adhere to strict syntactical rules. Therefore, the results 224 are typically subjected to some form of semantic analysis 251 so that the location description makes reasonable sense. Application of the semantic analysis 251 can often reduce false results but involves additional processing and other resources which can make the on-line search inefficient and/or time-consuming which may undesirably reduce the quality of the user experience provided by the service.

Figure 3:
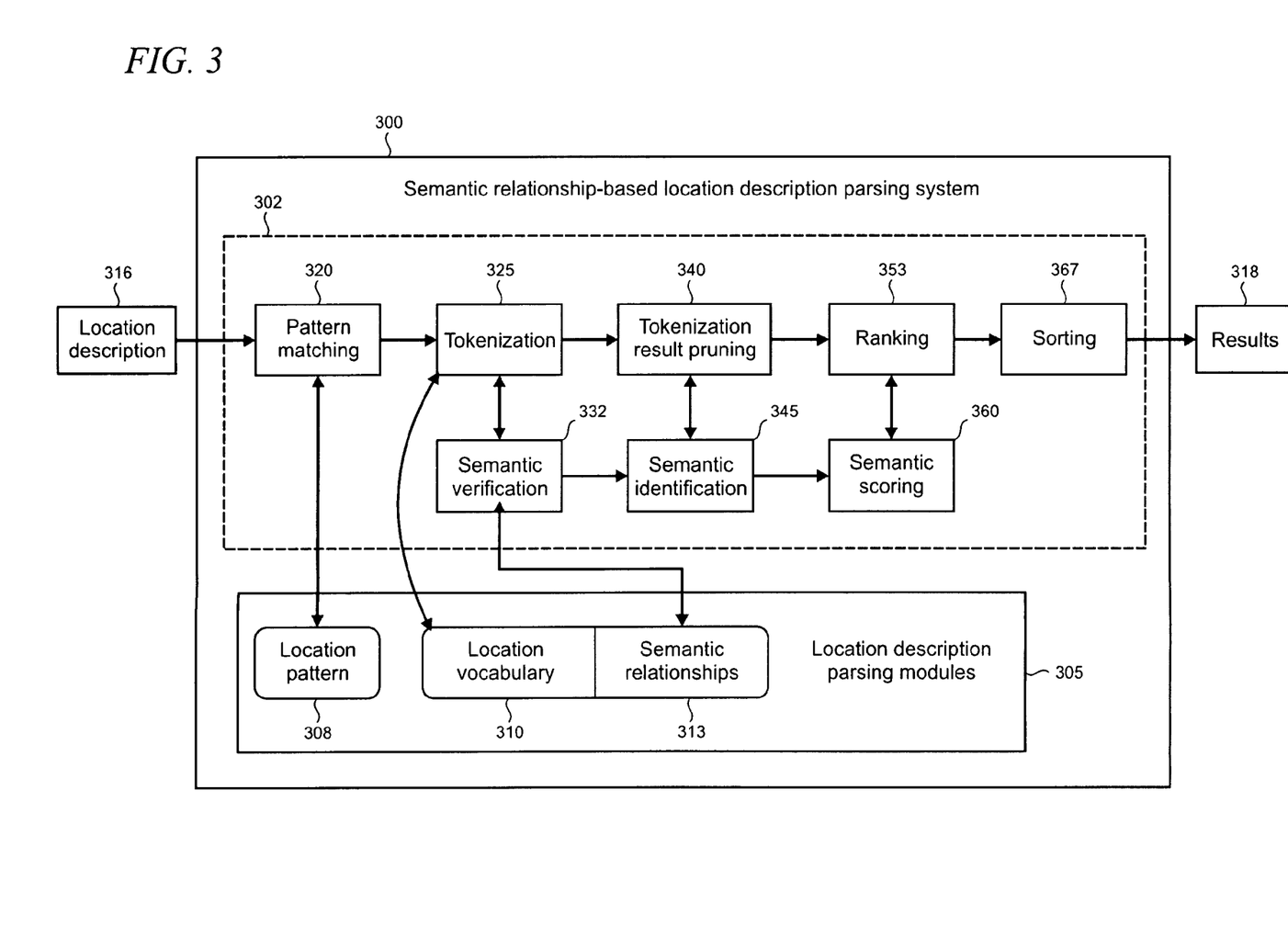
FIG. 3 shows an illustrative semantic relationship-based location description parsing system.

By comparison to the parsing system 202, the semantic relationship-based location description parsing system 300 in FIG. 3 integrates semantic verification into the parsing process to prevent the generation of false results while obviating the need for additional and separate semantic analysis. The parsing system 300 applies a method comprising a number of steps (collectively identified by reference numeral 302) that are performed in association with data that is contained in location description parsing modules 305 which include a location pattern module 308, a location vocabulary module 310, and a semantic relationship attributes module 313.

The parsing system 300 may be utilized, for example, by the on-line search service 125 to take an arbitrarily formed location description 316 from a user 105 and output results 318 that have real-world meanings.

The parsing system 300 will be further described using a specific illustrative scenario which involves a description from a user 105 of a location in New York City. The user 105 enters the following string in the web browser 146 as a location description:

Lincoln blvd NE 30th St New York WA

Figure 4:
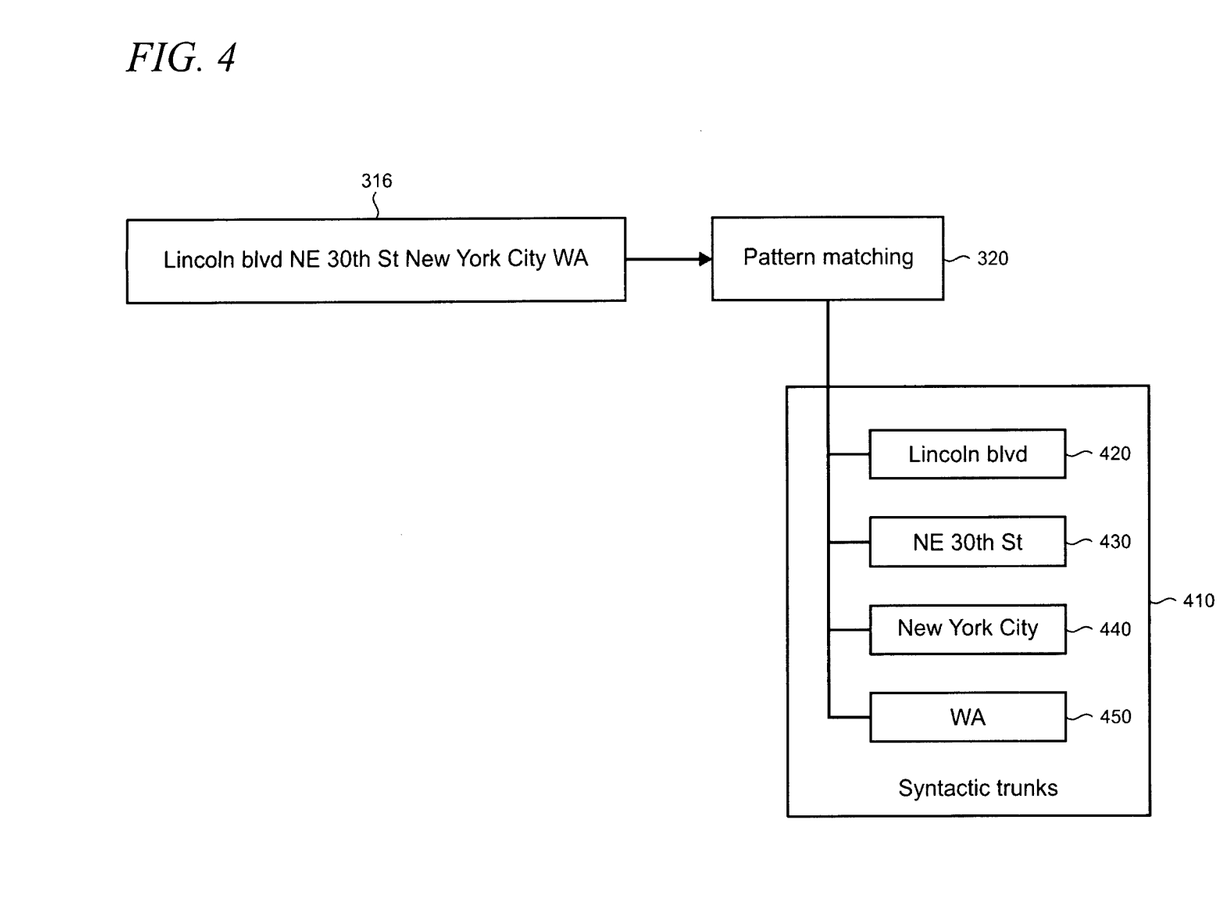
FIGS. 4-8 show a parsing method applied to an illustrative scenario involving a description of a location in New York City.

As shown in FIG. 4, the location description 316 is subjected to pattern matching 320 which uses location patterns provided by the location pattern module 308 (FIG. 3) such as *'blvd', *'st', *'city', etc., to break up the location description 316 into syntactic trunks 410. In this example, there are four trunks:

"Lincoln blvd", "NE 30th St", "New York City", "WA"

as respectively indicated by reference numerals 420, 430, 440 and 450.

Figure 5:
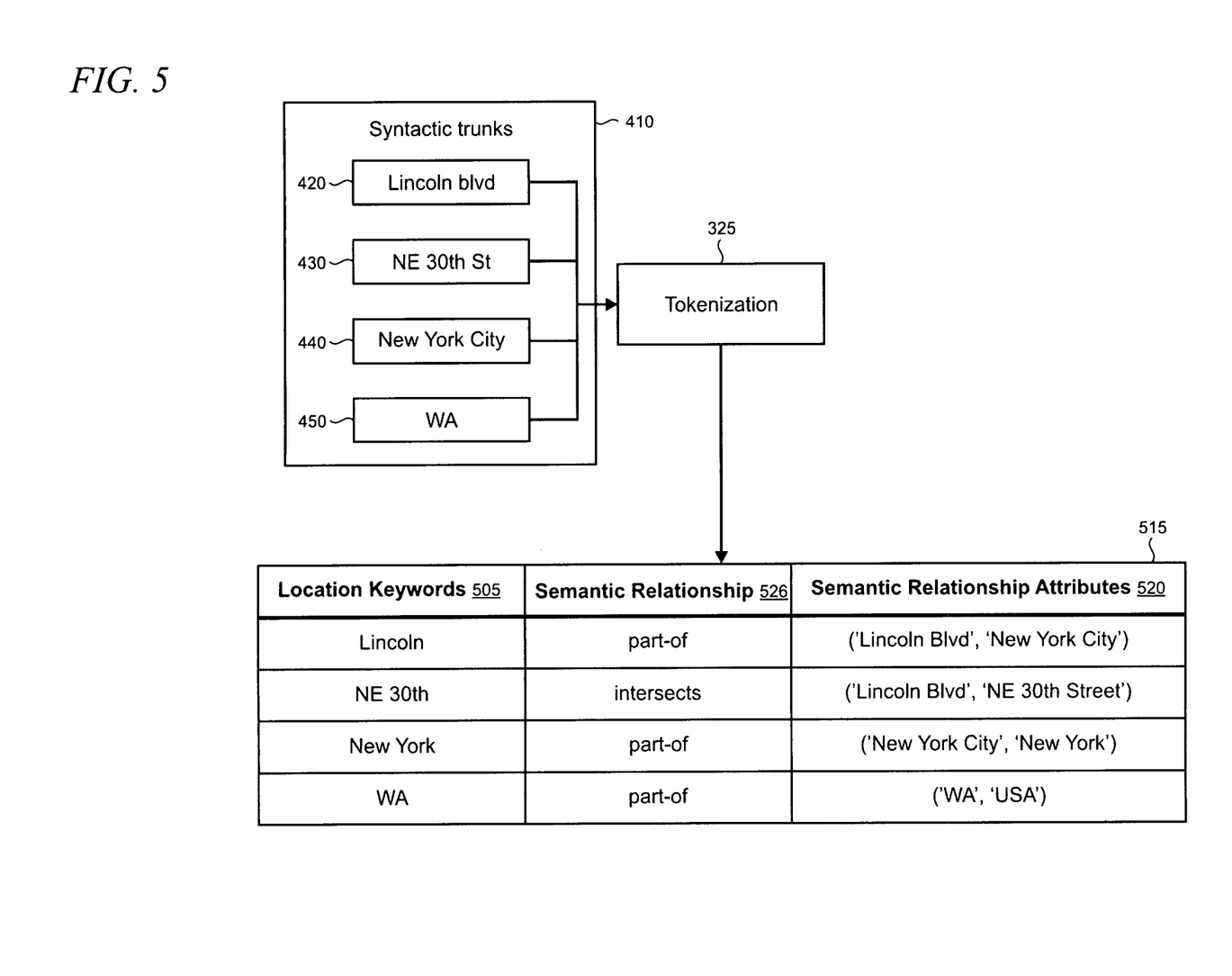

The location vocabulary module 310 (FIG. 3) provides location vocabulary to the tokenization process 325 to tokenize the location description. As shown in FIG. 5, the tokenization process 325 identifies location keywords 505 and their associated semantic relationship attributes 520 from the description in the syntactic trunks 410. For example, as indicated in the table 515, the location keywords and their associated semantic relationship attributes 520 are spatially related through the semantic relationships 526:

Lincoln: a street and its associated attributes, such as
 Part-of ('Lincoln blvd', New York City')
 Intersects ('Lincoln blvd', 'NE 30th st');
NE 30th: a street and its associated attributes, such as
 Part-of ('NE 30th st', 'New York City');
New York: a city and its associated attributes, such as
 Part-of ('New York City', 'NY');
WA: a state and its associated attributes, such as
 Part-of ('WA', 'USA')

Figure 6:
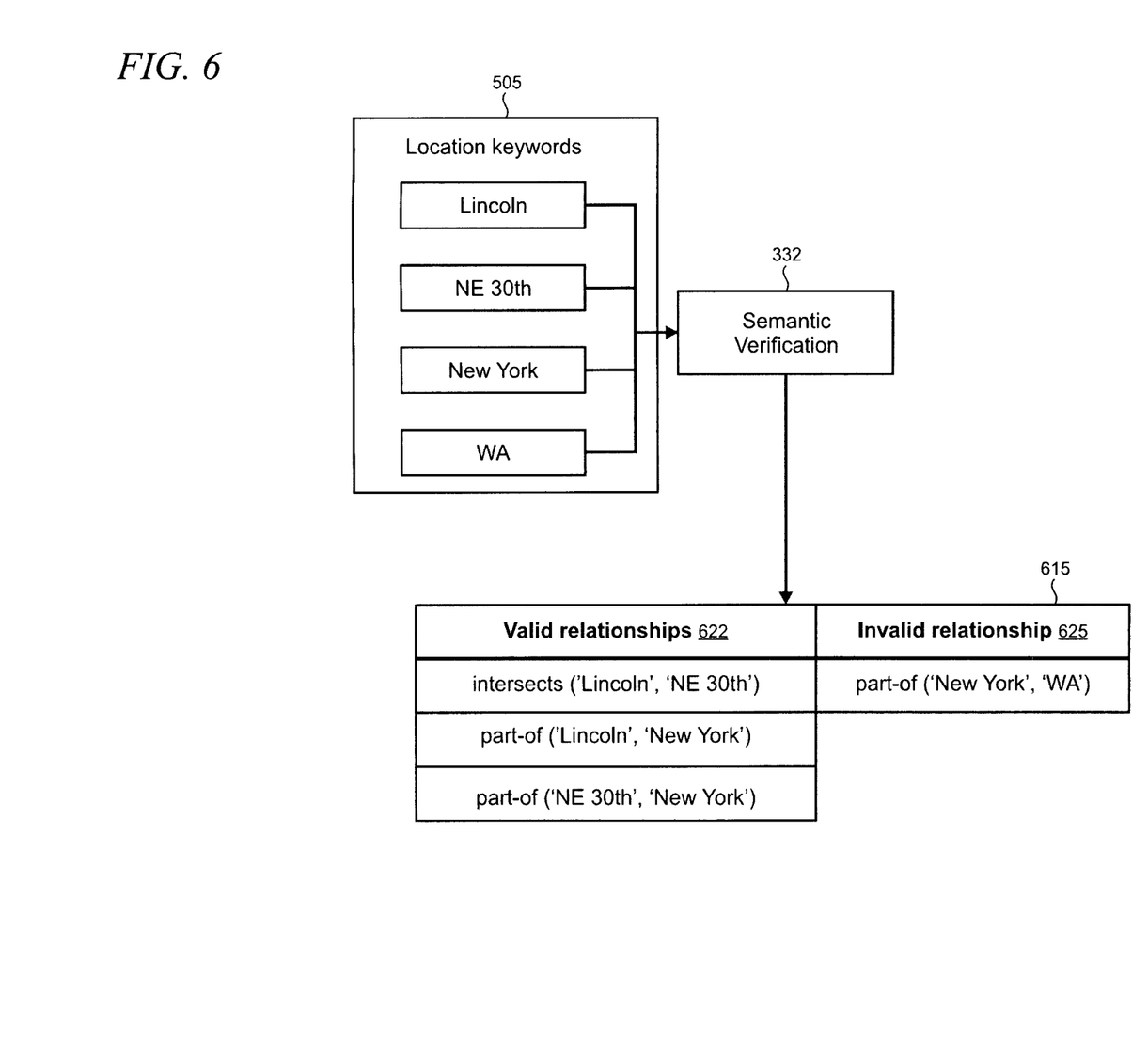

Semantic verification 332 (FIG. 3) is performed to determine if the tokenization results are valid by loading all the attributes 520 generated by the semantic relationships module 313 that are associated with the location keywords 505 as extensions to the location vocabulary. Thus, as shown in table 615 in FIG. 6, for the example scenario, the certain location keywords 505 are validly spatially related while others are not. The valid relationships 622 include:

Intersects ('Lincoln', 'NE 30th')
Part-of ('Lincoln', 'New York')
Part-of ('NE 30th', 'New York')

The relationships are valid because there are streets in New York City named Lincoln Blvd and NE 30th St which do intersect and such facts (among others) may be pre-calculated and stored by the semantic relationships module 313. The invalid relationship 625 in this example is:

Part-of ('New York', 'WA')

because factually there are no cities named New York in the state of Washington, or in Washington D.C. (District of Columbia). Accordingly, "New York" is not semantically related to "WA" in a way that makes reasonable sense.

Figure 7:
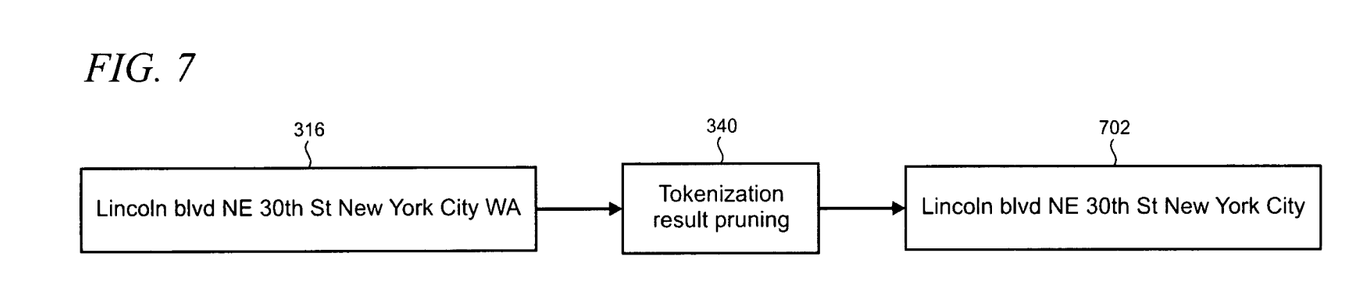

The method 302 continues with tokenization results pruning 340. As shown in FIG. 7, the invalid tokenization results are pruned from the location description 316. In this example, "WA" is removed to leave "Lincoln blvd NE 30th St New York City as a result, as indicated by reference numeral 702. The tokenization results 702 which remain after pruning have passed semantic verification and thus have real-world meaning and make sense.

Figure 8:
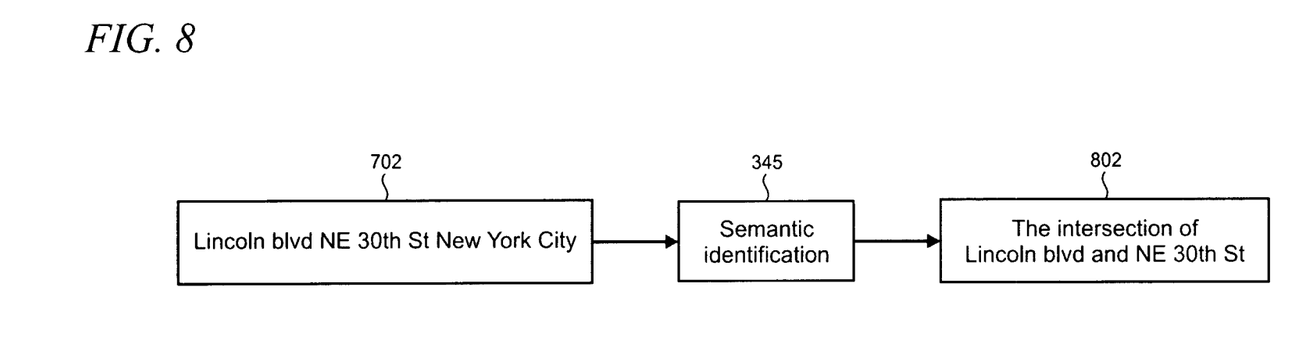

As shown in FIG. 8, the pruned tokenization results 702 are subjected to semantic identification 345 (FIG. 3) to generate a primary location identification 802 based on the semantic relationships attributes that are generated by module 313. In this example scenario, the primary location is identified as:

the intersection of Lincoln blvd and NE 30th st.

Referring again to FIG. 3, results of the parsing performed by the semantic parsing system 300 may be subjected to semantic scoring 360. This may be particularly beneficial in cases where the location description 316 contains a relatively large number of keywords, or has some degree of ambiguity for which a multiplicity of reasonable semantic meanings may be inferred. In such cases, a set of two or more results may be generated by the parsing system 300. Using the present scenario, one illustrative formula for calculating a semantic score for the parsing results is:

$$\text{WeightofIntersection} \times B(\text{intersects}(\text{'Lincoln'}, \text{'NE 30th'})) \times U(\text{'Lincoln blvd'}) \times U(\text{'NE 30th st'}) \times U(\text{'New York City'})$$

where U( ) returns the linguistic probability of a location keyword when it stands alone (i.e., a "uni-gram"), and B( ) returns the linguistic probability of two location keywords when they stand together (i.e., a "bi-gram").

Each parsing result produced by the system 300 may then be ranked and sorted, as respectively indicated by reference numerals 353 and 367 according to their semantic score.

Figure 9:
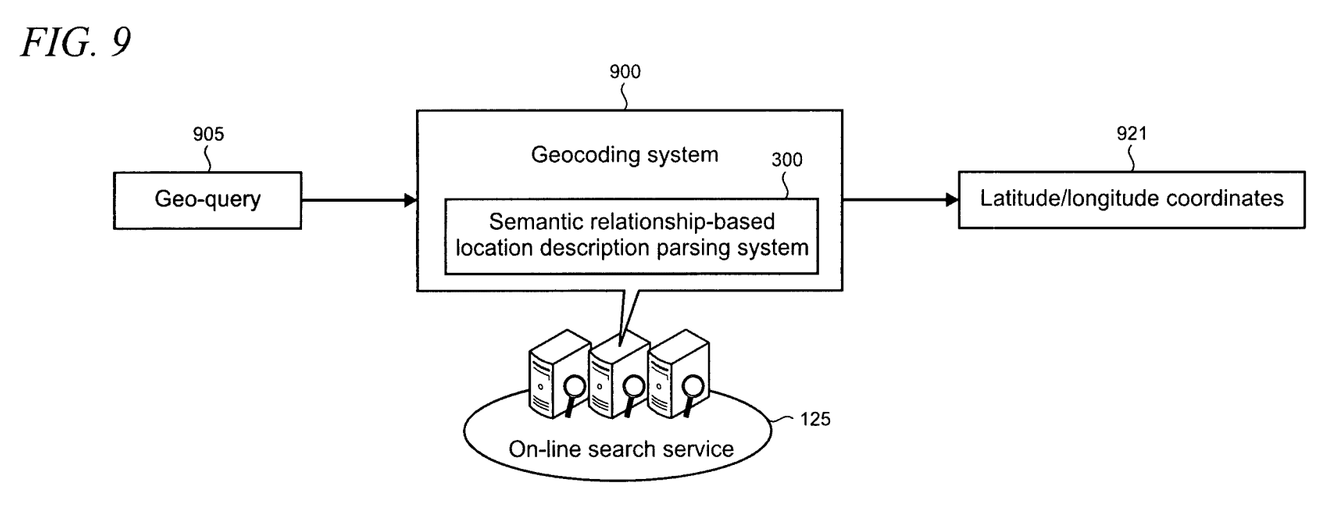
FIG. 9 shows an illustrative geocoding system that is adapted to utilize the present semantic relationship-based location description parsing.

Turning now to FIGS. 9-12, a variety of illustrative applications of the present semantic relationship-based location description parsing system 300 are presented. In FIG. 9, the on-line search service 125 is adapted to support a geocoding system 900 that is commonly utilized as a base component of an on-line mapping service that is provided to user 105 (FIG. 1). Generally speaking, the accuracy and performance of a geocoding system will determine the end user usability of the system. Greater accuracy and performance efficiency will promote more map search queries from the users 105.

The geocoding system 900 receives a geo-query 905 from the user 105 and then typically calculates latitude and longitude coordinates 921 to be able to map a location that is parsed from the geo-query. In some cases, a polygon (e.g., a zip code, lot, census track, tax block, city block, neighborhood, city or state boundary, etc.) may be calculated that is associated with the parsed location.

Figure 10:
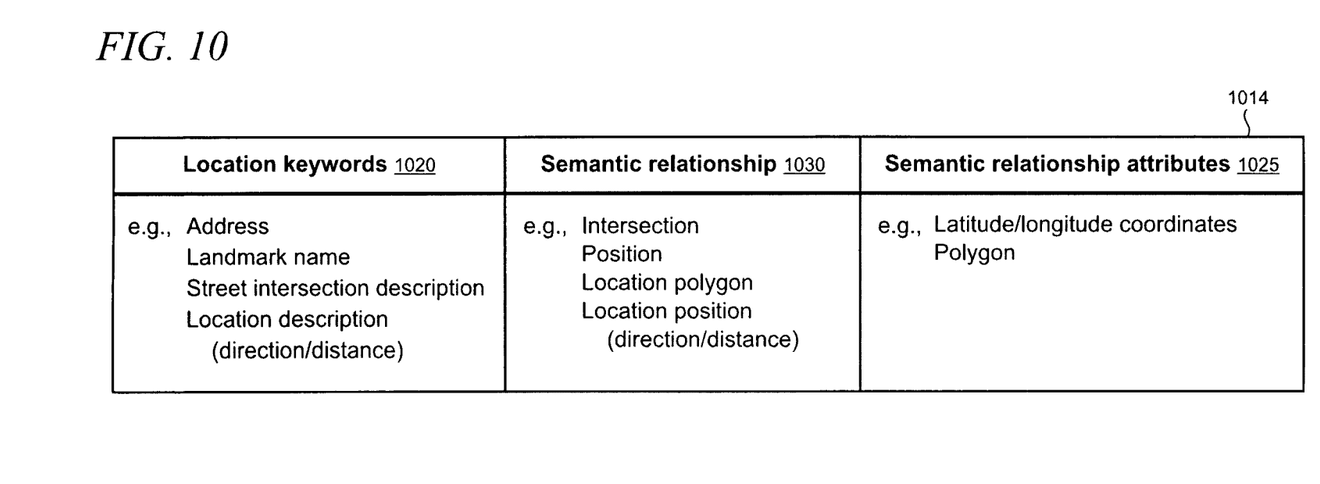
FIG. 10 shows a table of illustrative location keywords, semantic relationships, and semantic relationship attributes associated with the geocoding system shown in FIG. 9.

The present parsing system 300 may be utilized in a geocoding application by parsing the geo-query for location keywords 1020, as shown in the table 1014 in FIG. 10, such as address, landmark name, description of street intersection, or description of a location with a direction and distance. The parsing system 300 may then generate a set of parsing results together with the latitude and longitude coordinates (or polygon) as associated semantic relationship attributes 1025 where the attributes have a semantic relationship 1030 such as intersection, position, location polygon, or location distance given by a direction and distance, for example.

As the latitude and longitude or polygon semantically related to a location keyword can be pre-calculated and stored as attributes in the vocabulary provided by the semantic relationship module 313, the geocoding system 900 may quickly and efficiently return semantically sensible results responsively to a user's geo-query 905. This feature can be expected to help increase the overall map search query volume in some cases.

Figure 11:
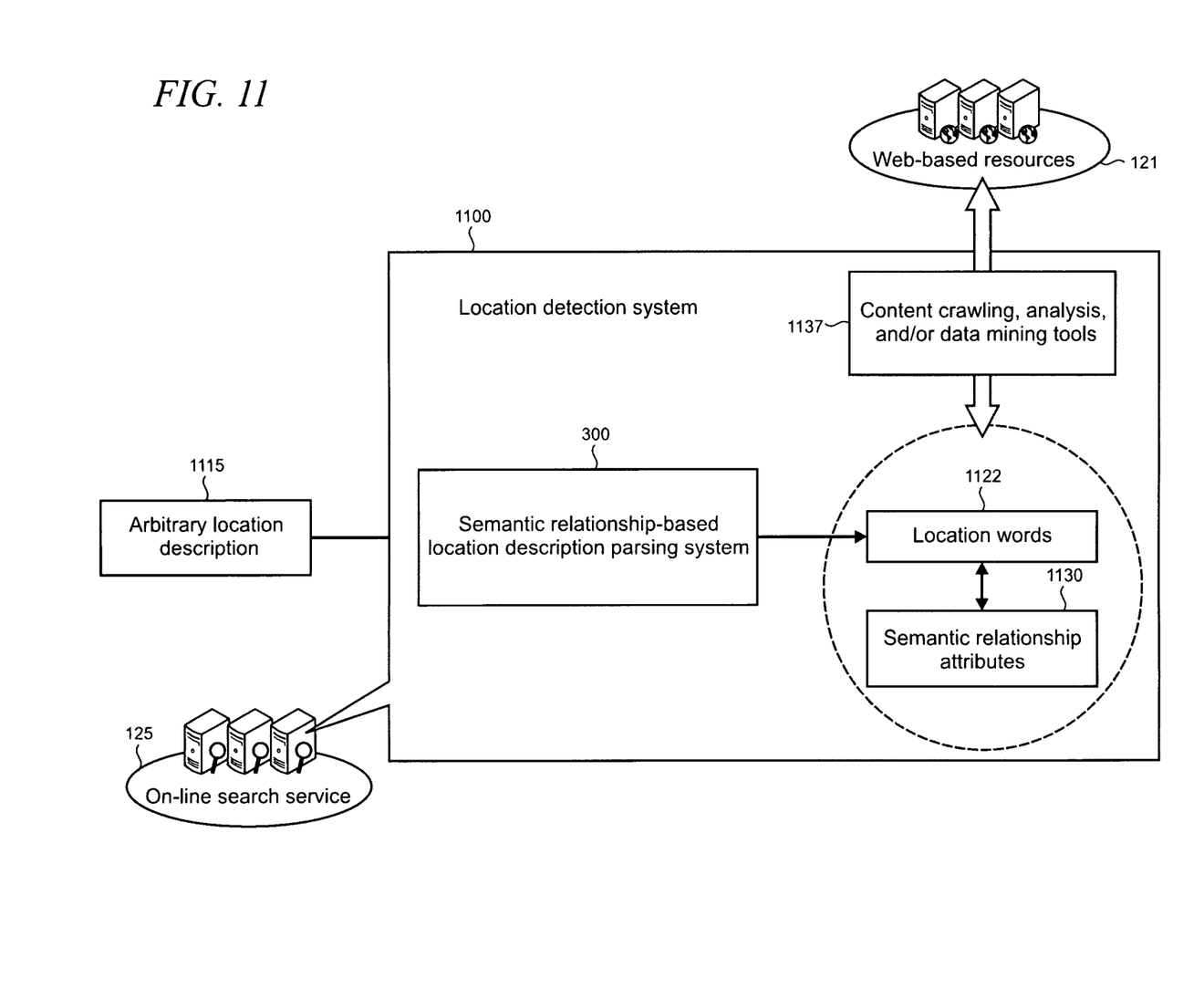
FIG. 11 shows an illustrative location detection system that is adapted to utilize the present semantic relationship-based location description parsing.

In FIG. 11, the on-line search service 125 is adapted to support a location detection system 1100. Here, given an arbitrary location description 1115 such as "I visit Space Needle today", the system 1100 extracts location words 1122 (which, in this example, are "Space Needle"). The parsing system 300 through the semantic identification 345 can then identify the primary location (here, a famous landmark/tourist attraction in Seattle, Wash., USA).

The parsing system 300 may be utilized in the location detection system 1100 to output the location words 1122 and associated semantic relationship attributes 1130 that can then be used by various content crawling, analysis, and/or data mining tools 1137 when collecting data, for example, from the web-based resources 121. Because the results of the parsing system 300 are semantically sensible, the ability of the tools 1137 to derive more meaning from the parsed results is enhanced to thereby enable richer and more comprehensive location detection services to be provided to the users.

Figure 12:
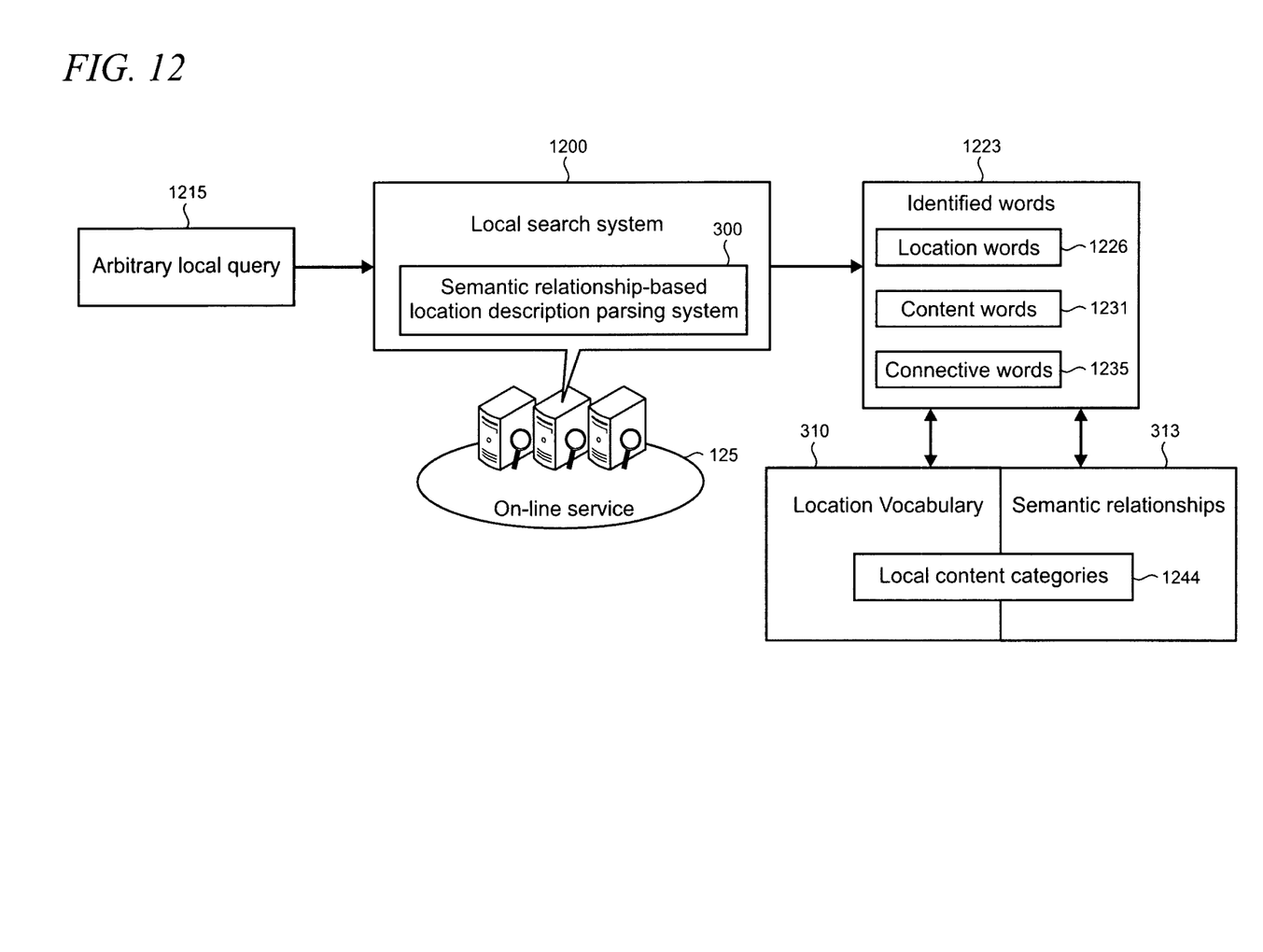
FIG. 12 shows an illustrative local search system that is adapted to utilize the present semantic relationship-based location description parsing.

In FIG. 12, the on-line search service 125 is adapted to support a local search system 1200 where an arbitrary local query 1215 (i.e., a query that contains information of a local nature) is parsed by the parsing system 300 to extract identified words 1223. In this example the identified words include location words 1226, content words 1231, and connective words 1235 which may be used by the local search system 1200 to understand the intent of the user's local query 1215 to thereby produce highly relevant local search results. In this application, the location vocabulary in module 310 and attributes in the semantics relationships module 313 are extended to include local content categories 1244. For example, in a local query which contains "Pizza in ZhongGuanCun area", the location word 1226 is "ZhongGuanCun", the content word is "Pizza", and the words such as "in" are connective words.

The application examples shown in FIGS. 9-12 and described in the accompanying text are intended to be illustrative and should not be construed as the only applications that may benefit from the present semantic relationship-based location description parsing system 300. For example, applications may also be supported which include crawling web sites (e.g., resources 121 in FIG. 1) for points-of-interest and directory services such as yellow pages services. Other location-related tools such as those which crawl travel routes may also be supported in some scenarios.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed on a computing device, the method comprising:

extracting, based on grammatical rules, location keywords from a location description; and checking for a semantic relationship among the extracted location keywords to derive a valid semantic meaning of the location description, the checking configured for further deriving:

a) a spatial part-of relationship between two locations represented by the location keywords extracted from the location description, where a first of the two locations as indicated by a first of the extracted location keywords is a part of a second of the two locations as indicated by a second of the extracted location keywords, b) a spatial near-by relationship between the two locations represented by the location keywords extracted from the location description, where the first of the two locations as indicated by the first of the extracted location keywords is located proximate to the second of the two locations as indicated by the second of the extracted location keywords, and c) a spatial intersects relationship between the two locations represented by the location keywords extracted from the location description, where the first of the two locations as indicated by the first of the extracted location keywords intersects the second of the two locations as indicated by the second of the extracted location keywords.

2. The method of claim 1 in which the checking comprises verifying the semantic relationship against semantic relationship attributes associated with each of the location keywords in the location description.

3. The method of claim 2 in which the semantic relationship attributes are pre-calculated in advance of the semantic verification.

4. The method of claim 1 in which the grammatical rules are implemented by one or more of tokenization technologies, pattern matching technologies, or dictionary-driven technologies.

5. The method of claim 1 including a further step of implementing a ranking system for calculating a rank score for the location description using the semantic relationship.

6. The method of claim 1 where the extracting further comprises extracting semantic relationship attributes that are associated with the location keywords.

7. The method of claim 1 where the extracted location keywords share a valid spatial relationship.

8. A system comprising at least one computing device and at least one module that are together configured for performing actions comprising:
- extracting, based on grammatical rules, location keywords from a location description; and
- checking for a semantic relationship among the extracted location keywords to derive a valid semantic meaning of the location description, the checking configured for further deriving:
  a) a spatial part-of relationship between two locations represented by the location keywords extracted from the location description, where a first of the two locations as indicated by a first of the extracted location keywords is a part of a second of the two locations as indicated by a second of the extracted location keywords,
  b) a spatial near-by relationship between the two locations represented by the location keywords extracted from the location description, where the first of the two locations as indicated by the first of the extracted location keywords is located proximate to the second of the two locations as indicated by the second of the extracted location keywords, and
  c) a spatial intersects relationship between the two locations represented by the location keywords extracted from the location description, where the first of the two locations as indicated by the first of the extracted location keywords intersects the second of the two locations as indicated by the second of the extracted location keywords.

9. The system of claim 8 where the checking comprises verifying the semantic relationship against semantic relationship attributes associated with each of the location keywords in the location description.

10. The system of claim 9 where the semantic relationship attributes are pre-calculated in advance of the semantic verification.

11. The system of claim 8 where the grammatical rules are implemented by one or more of tokenization technologies, pattern matching technologies, or dictionary-driven technologies.

12. The system of claim 8, the actions further comprising implementing a ranking system for calculating a rank score for the location description using the semantic relationship.

13. The system of claim 8 where the extracting further comprises extracting semantic relationship attributes that are associated with the location keywords.

14. The system of claim 8 where the extracted location keywords share a valid spatial relationship.

15. At least one computer storage device storing modules that, when utilized by a computing device, cause the computing device to perform actions comprising:
- extracting, based on grammatical rules, location keywords from a location description; and
- checking for a semantic relationship among the extracted location keywords to derive a valid semantic meaning of the location description, the checking configured for further deriving:
  a) a spatial part-of relationship between two locations represented by the location keywords extracted from the location description, where a first of the two locations as indicated by a first of the extracted location keywords is a part of a second of the two locations as indicated by a second of the extracted location keywords,
  b) a spatial near-by relationship between the two locations represented by the location keywords extracted from the location description, where the first of the two locations as indicated by the first of the extracted location keywords is located proximate to the second of the two locations as indicated by the second of the extracted location keywords, and
  c) a spatial intersects relationship between the two locations represented by the location keywords extracted from the location description, where the first of the two locations as indicated by the first of the extracted location keywords intersects the second of the two locations as indicated by the second of the extracted location keywords.

16. The at least one computer storage device of claim 15 where the checking comprises verifying the semantic relationship against semantic relationship attributes associated with each of the location keywords in the location description.

17. The at least one computer storage device of claim 16 where the semantic relationship attributes are pre-calculated in advance of the semantic verification.

18. The at least one computer storage device of claim 15, the actions further comprising implementing a ranking system for calculating a rank score for the location description using the semantic relationship.

19. The at least one computer storage device of claim 15 where the extracting further comprises extracting semantic relationship attributes that are associated with the location keywords.

20. The at least one computer storage device of claim 15 where the extracted location keywords share a valid spatial relationship.

* * * * *